United States Patent [19]

Rygiol

[11] 3,870,849

[45] Mar. 11, 1975

[54] MULTI-ARC PIPE WELDING

[76] Inventor: Henry V. Rygiol, 3146 Purer Rd., Escondido, Calif. 92025

[22] Filed: Aug. 21, 1973

[21] Appl. No.: 390,221

Related U.S. Application Data

[62] Division of Ser. No. 235,705, March 17, 1972, Pat. No. 3,780,254.

[52] U.S. Cl. .......................................... 219/60 A
[51] Int. Cl. ............................................ B23k 9/02
[58] Field of Search ................. 219/8.5, 60 A, 60 R

[56] References Cited
UNITED STATES PATENTS

| | | | |
|---|---|---|---|
| 3,400,237 | 9/1968 | Kazlauskas | 219/60 A |
| 3,509,303 | 4/1970 | Wesler | 219/60 R |
| 3,649,799 | 3/1972 | Jeromson et al. | 219/60 A |

Primary Examiner—J. V. Truhe
Assistant Examiner—N. D. Herkamp
Attorney, Agent, or Firm—Edward D. O'Brian

[57] ABSTRACT

Pipe, tubing and the like can be satisfactorily welded without the use of tack welds, restraining clamps or the like so as to be in a desired alignment through the use of an apparatus having a plurality of separate electrodes mounted equidistant from one another around a ring-like area or path where a weld is to be created. Such electrodes are preferably mounted upon a holding means which in turn is rotatably mounted on a mounting member. Rotating means are provided for rotating the holding means around the path or area where a weld is to be created as separate welding currents are supplied to the electrodes through appropriate supply means.

2 Claims, 6 Drawing Figures

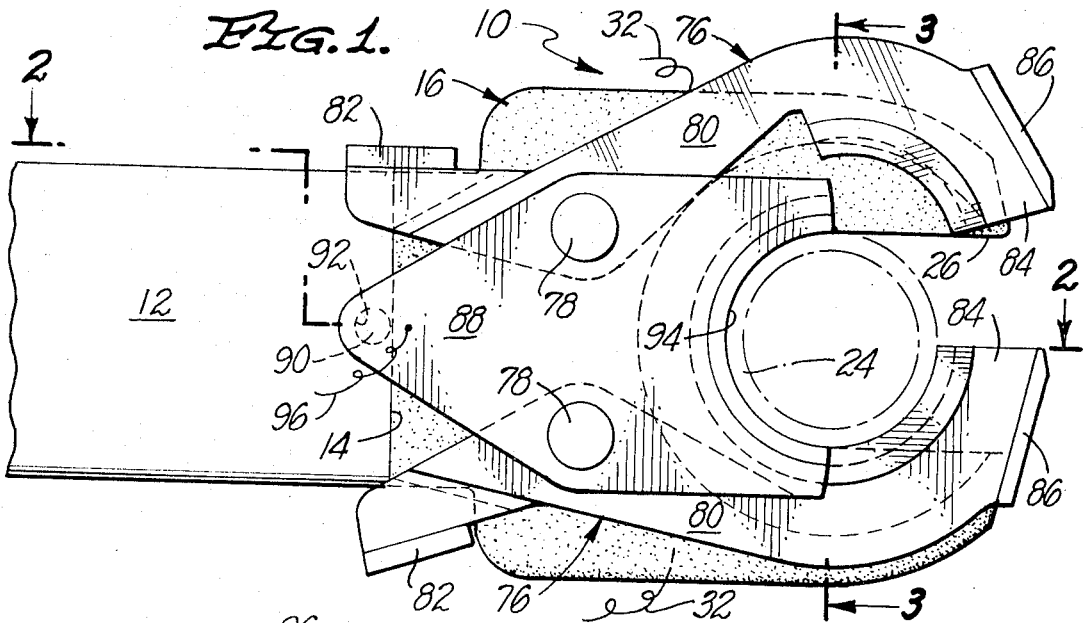
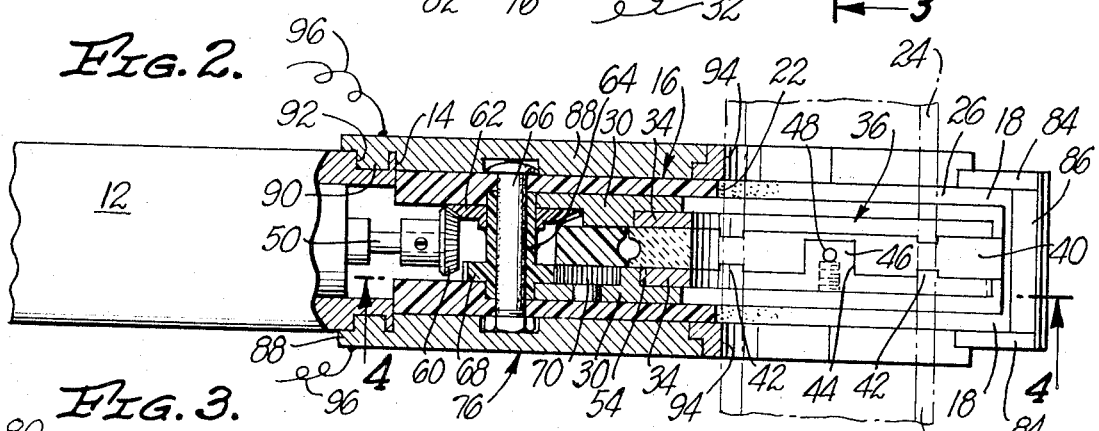
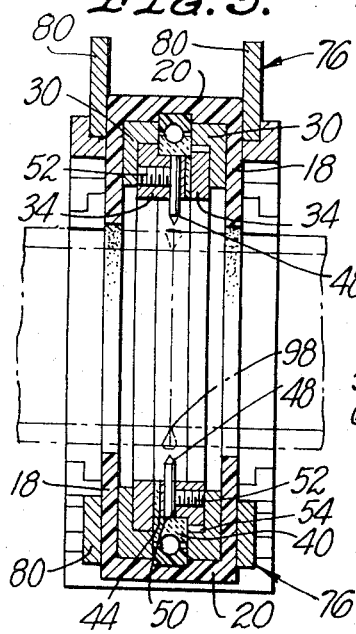
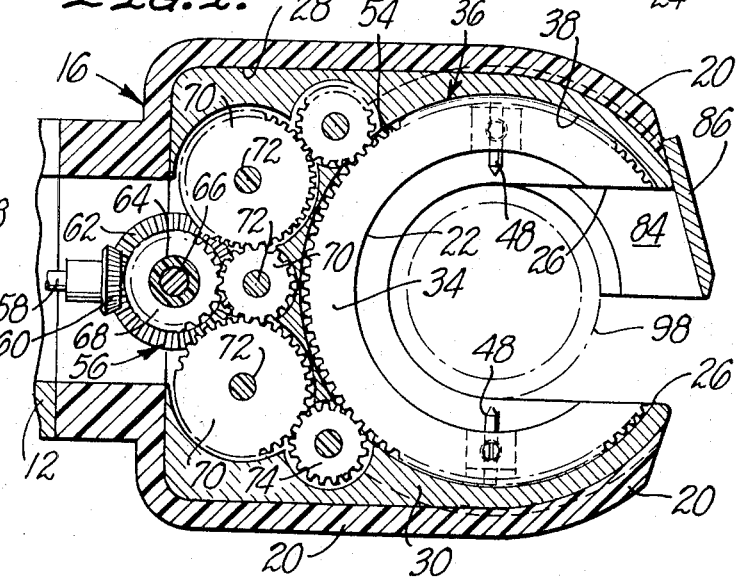

MULTI-ARC PIPE WELDING

CROSS-REFERENCES TO RELATED APPLICATIONS

This application is a division of the copending application Ser. No. 235,705 filed Mar. 17, 1972 entitled "Multi-Arc Pipe Welding" now U.S. Pat. No. 3,780,254 issued Dec. 18, 1973.

BACKGROUND OF THE INVENTION

It is frequently necessary to weld adjacent ends of round or substantially round hollow metal parts to one another. In welding such parts together, the weld is created in a ring-like area or path where the two parts abut against one another. At times, as for example, when two oblong parts are being connected to one another or when parts are being connected to one another at a precise angle or when one pipe is being abutted against a centrally located opening in another pipe such a ring-like line or pattern is not a precise circular line, but is merely a line or area surrounding the junctures of the parts being joined.

In the past a problem has been encountered in joining two tubes or pipes or the like along surrounding lines as indicated when conventional welding techniques have been used. In such techniques it has been established practice to utilize a single welding electrode and to move this electrode along a ring-like area or path as the weld is created. As this type of operation is used a single welding electrode progresses a temperature differential produced along the surrounding line or ring-like area where the weld is created.

As such an electrode is advanced in welding two tubes or pipes or the like area being welded opposite the electrode becomes molten as the result of current flow. As a welding electrode is advanced an area which is molten will tend to cool and as it cools the molten metal will solidify. Most metals will shrink as they pass in this manner from the liquid to the solid state, and as a result there will tend to be a certain amount of cocking of the two parts being joined as the welding operation proceeds and as successive regions along the weld line are liquidified and then allowed to cool.

In certain parts this tendency towards cocking of the parts as they are being welded may not be disadvantageous. However, frequently it is desired to have two pipes or tubes being welded joined so that there is precise alignment between them so that they are located at a precise, desired angle with respect to one another. Obviously the tilting or cocking consequence of utilizing a single welding electrode in joining such two parts tends to interfere with the parts being secured to one another in a desired manner. As a result of this a number of expedients have been adopted in the industry in an effort to make it possible to accurately secure tubes or pipes to one another in a desired manner.

It has been proposed to utilize restraining clamps during a welding operation as indicated. In theory such restraining clamps are intended to overcome the distorting forces resulting from melting and then cooling metal along a line or area where a weld is being made surrounding two pipes, tubes or the like. Such clamps are relatively disadvantageous to utilize. Further, from a purely economic standpoint they are undesirable because of their initial costs and the costs of the labor required to effectively utilize them. In some applications clamps of this type are not generally considered effective.

Another technique which has been adopted and utilized to prevent the cocking or tilting indicated has involved welding small areas or points at periodic intervals along a surrounding line or ring where a weld is to be created so as to "tack" the parts being welded together so that they cannot tilt or cock with respect to one another as the areas between the tacks are welded together in a conventional manner. This procedure is disadvantageous in that it is time consuming in character, and therefore uneconomically desirable. Also, so-called "tack" welding is frequently disadvantageous and undesirable because it results in welded joints of an undesirable quality. Generally speaking a weld should be of the highest quality reasonably achievable.

Other expedients and techniques have been developed and to some extent utilized in efforts to weld pipes, tubes or the like to one another along a ring-like surrounding line or area. It is considered unnecessary to discuss such other expedients and techniques in this specification since a detailed understanding of such expedients and techniques is not necessary to an understanding of the invention set forth in this specification. Although by and large procedures as indicated can be considered as at least effective to a degree, it is considered that there remains a distinct need for improvement in the art or field of welding pipes, tubes and the like to one another.

SUMMARY OF THE INVENTION

A broad objective of the present invention is to fulfill this need. A related generalized objective of the invention is to provide new and improved apparatuses for welding two pipes, tubes or the like together along a continuous ring-like area or line. Another objective of the invention is to provide apparatuses as indicated which may be easily and conveniently constructed, which may be effectively utilized with a minimum of difficulty and which are capable of prolonged performance with a minimum of maintenance.

In accordance with this invention the various objectives of it are achieved by manufacturing an apparatus which includes a mounting member for engagement with at least one member or part to be welded, a holding means rotatably mounted on the mounting member so as to be capable of being rotated with respect to the part to be welded around a ring-like area or line where a weld is to be created, a plurality of equally spaced electrodes mounted on the holding means so as to be capable of being rotated with the holder means, means for rotating the holding means and means for supplying currents to the electrodes employed.

BRIEF DESCRIPTION OF THE DRAWINGS

Further details of the present invention as well as many advantages of it will become apparent from a careful consideration of the remainder of this specification including the appended claims in conjunction with the accompanying drawings in which:

FIG. 1 is a side elevational view of one presently preferred embodiment or form of an apparatus in accordance with this invention;

FIG. 2 is a partial cross-sectional view taken at line 2—2 of FIG. 1;

FIG. 3 is a cross-sectional view taken at line 3—3 of FIG. 1;

FIG. 4 is a partial cross-sectional view taken at line 4—4 of FIG. 2;

Figure 5:
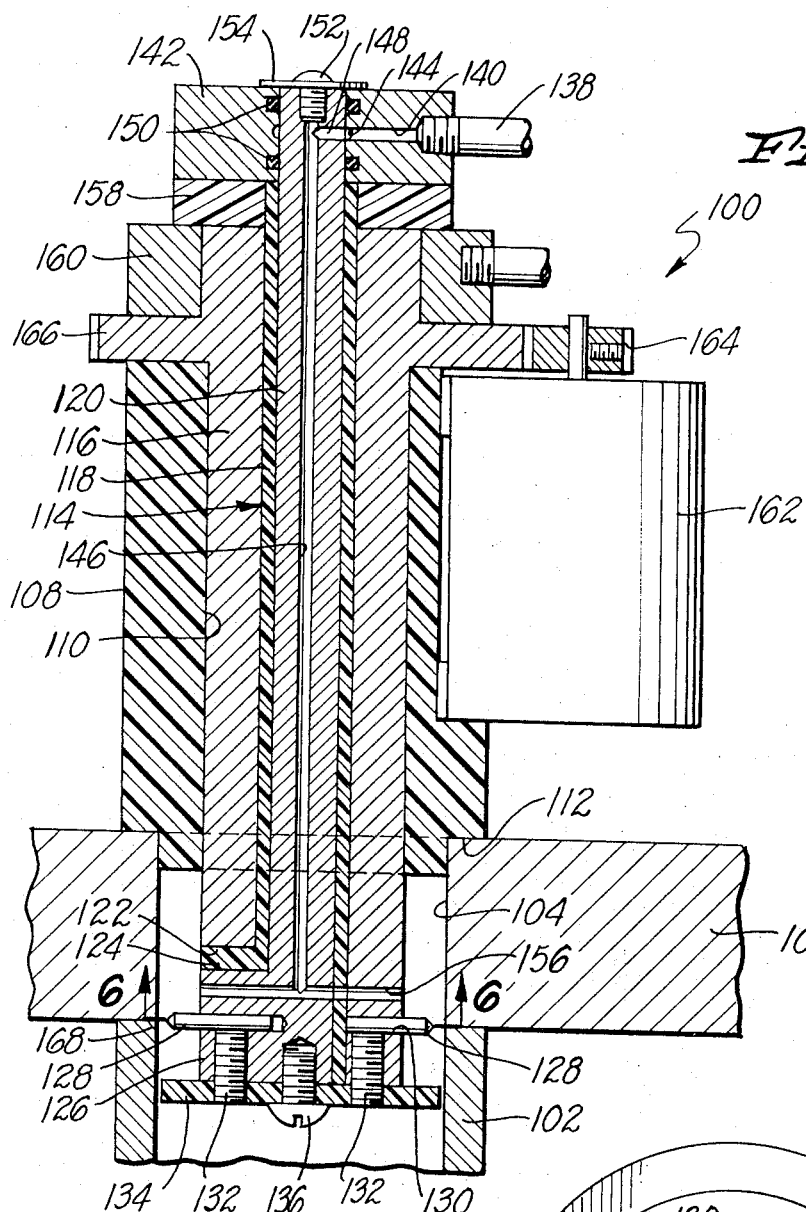
FIG. 5 is a cross-sectional view of another presently preferred embodiment or form of an apparatus in accordance with this invention.

The various different forms or embodiments of apparatuses in accordance with the invention each differ from one another in that they are presently intended for different utilizations. All of these forms or embodiments of apparatuses in the invention are related in that they utilize the essential intangible concepts of the invention set forth in the appended claims. Through the use or exercise of routine engineering or mechanical skill these concepts can be utilized in many differently appearing and differently constructed apparatuses without departing from the scope of the invention as indicated by the claims.

DETAILED DESCRIPTION OF THE PREFERRED EMBODIMENT

In FIGS. 1 through 4 of the drawings there is shown a welder 10 in accordance with this invention which includes a rectlinear handle-like housing or support 12. An end 14 of the support 12 carries a non-conductive housing 16 which includes parallel side plates 18 and connecting walls 20 which curve generally towards one another remote from the support 12. These plates 18 are provided with openings 22 corresponding in diameter to the diameter of pipes 24 to be welded utilizing the welder 10. Edge notches 26 lead from the opening 22 through the side plates 18 and the walls 20 so that the support 12 may be moved in order to fit the pipes 24 in the openings 22 as shown. It will be realized that this described construction in effect constitutes a generally U-shaped housing having an internal cavity 28.

This cavity 28 contains electrically conductive side plates 30 which are utilized to conduct electric currents from wires 32 to electrode holders 34 which rest against the side plates 30 so as to be in electrical communication with them. These holders 34 constitute a part of an electrode assembly 36 and fit within disc-like areas 38 in the side plates 30. In order to accommodate the pipes 24 both of the electrode holders 34 and both of the side plates 30 are provided with openings 22 and notches 26 corresponding to the openings 22 and the notches 26 previously described. These openings 22 and notches 26 in the side plates 30 and the electrode holders 34 have not been given separate numbers in the drawings in the interest of avoiding an excess of numerals being applied to the drawings.

The assembly 36 consists of the two electrode holders 34 and an electrically non-conductive disc 40 located between them. Preferably these holders 34 are mechanically interlocked as, for example, through the use of interfitting ridges and notches 42, although other equivalent mechanical expedients can be employed. The disc 40 is provided with recessed regions 44 which are adapted to accommodate small extensions 46 on the electrode holders 34 so that separate pointed electrodes 48 may be mounted in holes 50 in each through the use of conventional set screws 52. These set screws 52 secure the electrodes 48 in the structure shown so that they are directed along a line passing through a diameter of the opening 22 in the same plane transverse to the axis of this oppening 22. Thus, these electrodes 48 are equally spaced from one another around the opening 22. They are further equally located from the axis of the opening 22 so as to be spaced equally from the pipe 24.

In the welder 10 one of the electrode holders 34 is provided with peripheral gear teeth 54 so that the assembly 36 may be rotated as a unit through the operation of a gear train 56. This gear train 56 is adapted to be powered by any conventional means supplying power to a shaft 58 extending through the support 12. The shaft 58 rotates a bevel gear 50 which in turn rotates another bevel gear 62 on a hub 64 located around a bolt 66 extending between the side plates 18. This hub 64 carries a pinion gear 68 which in turn drives other pinion gears 70 mounted upon shafts 72 which in turn drive terminal pinion gears 74 engaging the gear teeth 54 at points which are spaced further from one another than the width of the notches 26.

On the exterior of the welder 10 there are located retainers 76 which are rotatably mounted about conventional fasteners 78 secured to the side plates 18 so that the centrally located arms 80 on these retainers 76 may be pivoted back and forth between the two different positions illustrated in FIG. 1. Small plates 82 secure the arms 80 on each of the retainers 76 together. These arms 80 carry curved jaws 84 which are connected by end walls 86. With this construction the retainers 76 can both be moved to an open position as shown by the retainer 76 at the top of FIG. 1 so that the pipes 24 may be located in place in a welder 10 as shown. After this has been accomplished the retainers 76 may be moved to closed positions as shown by the retainers 76 at the bottom of FIG. 1 so that the pipes 24 are rigidly held in place with respect to the welder 10.

The welder 10 also preferably includes locating plates 88 which are secured to the side plates 30 by being held against them through the use of the fasteners 78 and by having small cylindrical extensions 90 which project into corresponding shaped depressions 92 in the support 12. These plates 88 are preferably of electrically conductive material and have terminal curved notches 94 shaped to the curvature of pipes 24 to be welded so as to be capable of fitting tightly up against these pipes 24. If desired with the invention electrically conductive leads 96 may be connected to the plates 88 as shown.

During the use of the welder 10 the retainers 76 are opened and the pipes 24 are inserted against the bottoms of the notches 94 so that these notches 94 in effect serve as locating means for insuring proper positions of the pipes 24 and for establishing electrical conduction to them. Then the retainers 76 will be closed so that the pipes 24 are clamped in position within the openings 22. At this point mechanical power may be supplied to the shaft 58 so as to cause rotation of the electrode assembly 36 in such a manner that the assembly 36 rotates so as to close off the notches 26.

As this occurs electrical power is supplied through the wires 32 to the side plates 30 so that they will serve essentially as slip rings to transfer this electric power to the individual electrode holders 34 and to the electrodes 48. During the operation as described, these electrodes 48 rotate with respect to a ring-like area 98 where a weld is to be created so that the pipes 24 are welded together. Preferably power is supplied to the electrodes 48 for only sufficient time so that this complete area 98 is welded. During the welding operation the plates 88 will normally be utilized as what may be considered an electrical ground. If desired other equivalent conventional means for grounding may be used.

It is to be noted that with the welder 10 that separate currents of the same polarity are supplied to the electrodes 48. It is preferable with this welder 10 that arcs be created at both of these electrodes 48 simultaneously and that the current flow at both of these arcs be equal. In order to achieve this mode of operation it is preferred that the power utilized with the welder 10 be supplied through an electrical circuit as set forth in the U.S. Pat. No. 3,629,546 issued Dec. 21, 1971, entitled "Multi-Arc Welder." In the interest of brevity the entire disclosure of this patent specification is incorporated herein by reference.

From a consideration of the preceding it will be realized that the support 12 and the housing 16 in effect constitutes a mounting member of mounting means which is intended to be engaged with the pipes 24 to be welded. With this welder 10 the electrode assembly 36 constitutes a holding means which is rotatably mounted on this mounting means or mounting member. With the welder 10 the shaft 58 and the gear train 56 in effect constitute a means for rotating the electrode assembly 36. The wires 32 and the side plates 30 operate through a slip-ring action to transfer current to the electrode holders 34 and therefore may be considered as a means for transferring or supplying current.

Figure 6:
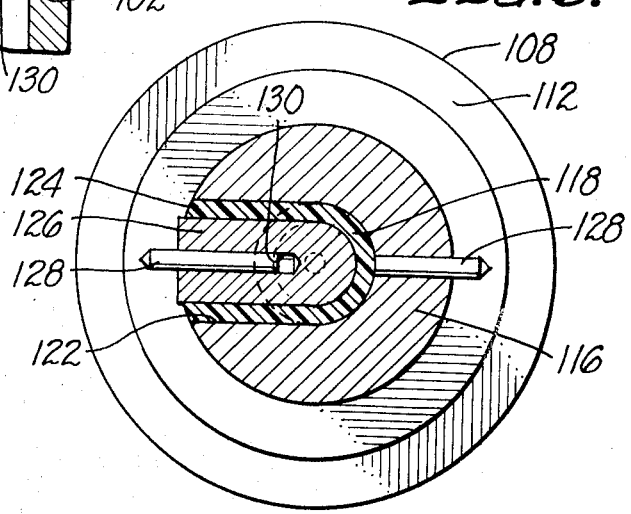
FIG. 6 is a cross-sectional view taken at line 6—6 of FIG. 5.

In FIGS. 5 and 6 of the drawings there is shown another welder 100 in accordance with this invention which is to be utilized in welding a tube 102 so that such a tube is in alignment with a cylindrical hole 104 and a plate 106. The welder 100 includes a generally tubular electrically non-conductive mounting or housing 108 having a centrally located bore 110 and a terminal shoulder 112 which is adapted to fit closely within the hole 104 so as to axially align the bore 110 with the axis of this hole 104.

Within the bore 110 there is located an electrode assembly 114 including an outer electrically conductive tube 116, an insulating sleeve 118 and an inner electrically conductive tubular rod 120. The tube 116 is provided with a terminal notch 122 and the sleeve 118 is provided with a flared end 124 fitting closely around the interior of this notch 122. This construction is designed so that an extension 126 on the rod 120 may be accommodated witin the notch 122 so that separate electrodes 128 may be mounted in holes 130 in the extensions 126 in the tubes 116 as shown through the use of conventional set screws 132.

It will be noted that these electrodes are located along a line passing through the axis of the hole 104 in the same plane perpendicular to this axis. It will also be noted that these electrodes 128 are equally spaced from one another around this axis and that they are both equidistant from this axis. If desired, the rod 120 may be closed off by a non-conductive locating plate 134 secured to the end of the assembly 114 within the tube 102 by means of a machine screw 136. This plate 134 is preferably dimensioned to fit within the tube 102 closely so as to in effect perform a shield which gas can escape with difficulty during the operation of the welder 100.

Such gas is supplied to the welder 100 through a tube 138 threaded into a cross-bore 140 in a terminal plate 142 which fits closely against the exterior of the tube 116. Preferably this bore 140 leads to an annular groove 144 in the interior of the plate 142 so that at all times during the operation of the welder 100 the gas may be supplied to an internal passage 146 extending along the axis of the rod 120 through a side bore 148. If desired, conventional elastomeric seals 150 may be located on each side of the groove 144 within the plate 142 so as to prevent gas seepage between the plate 142 and the rod 120. The end of the passage 146 if preferably secured shut by means of a small sealing screw 152 and a washer 154. The gas supplied in the manner described is conveyed along the passage 146 to a cross-bore 156 extending parallel to the electrodes 128 and adjacent to these electrodes in the region where a weld is to be created using the welder 100. It is noted that the cross-bore 156 extends through the tube 116, the extension 126, the sleeve 118 and the rod 120.

In the welder 100 an insulating washer 158 is located alongside of the plate 142 around the sleeve 118 so as to insulate this plate 142 and the rod 120 from the tube 116. This washer 158 also serves to retain in place another terminal plate 160 which is mounted upon the tube 116 so as to be in electrical contact with it as this tube is rotated. Such rotation is achieved through the use of a small motor 162 mounted on the housing 108 so as to drive a pinion gear 164 so that this pinion in turn drives a gear flange 166 located on the tube 116 between the housing 108 and the plate 160.

The operation of the welder 100 is essentially rather simple. Prior to its operation this welder 100 is inserted relative to the parts to be welded as shown. Then, an inert gas such as helium is supplied through the tube 138 so as to gradually flush out ambient air from the space between the shoulder 112 and the plate 134. The air displaced in this manner will pass between the periphery of the plate 134 and the interior of the tube 102. When the original air has been replaced in this manner the motor 162 may be operated while currents of the same polarity are supplied to the assembly 114 through the terminal plates 142 and 160 and while the parts being welded are gounded in a conventional manner. As the motor 162 operates the electrodes 128 will be moved in the ring-like area 168 where a weld is to be created. After the desired weld is created the current will, of course, be cut off, the motor 162 will no longer be operated and the welder 100 will be removed from the part welded.

It will be realized that in the welder 100 the mounting 108 is a mounting means which is utilized for rotatably supporting the assembly 114 and this assembly constitutes a holding means which is capable of being rotated relative to the mounting 108. The motor 162, of course, serves as a means for rotating this assembly 114 while power is supplied to it through the plates 142 and 160. These plates 142 and 160 in effect function as slip rings and serve as means to supply separate welding currents to the welder 100. Such currents are preferably obtained from a power supply as indicated in the preceding discussion.

From a careful consideration of the preceding it will be realized that the welders 10 and 100 are comparatively simple, relatively inexpensive devices which may be easily and conveniently manufactured and which are capable of being easily operated for prolonged periods with a minimum of maintenance. All of these welders are considered particularly significant because when they are operated as described arcs are created at a plurality of electrodes which are equally spaced from one another and from the axis around which they are moved. Although in the various welders shown, only two electrodes are used, a greater number of electrodes can be employed if for any reason this should be found to be advantageous provided all of the electrodes are positioned as described.

This use of at least two electrodes is related to one of the major advantages of the invention—the ability to weld tubes, pipes or the like so that there is no tendency for such members or parts to tilt or cock as a welding operation progresses. This effect is achieved because what in effect are separate welds are utilized at equally spaced distances along a weld ring, line or area so that the forces resulting from welding operations and the liquidification and subsequent solidifying of metal are balanced around an axis where a weld is created. Since spaced regions on various parts of the weld line or area are heated and cooled detrimental effects on alignment of two parts or members being welded together resulting from such heating and cooling are avoided with the invention by a balancing or equilization of the expansion and contractions caused forces around an axis where a weld is created.

Although these benefits are primarily achieved with a ring-like weld, they can also be achieved by utilizing apparatuses such as those described which are intended to weld mitered pipe corners or the like together since in joints as created between such corners the invention contemplates moving welding electrodes so that there is always a balance of force. Such a balance can be achieved as, for example, when a lateral pipe is joined at a right angle to a main pipe and in other circumstances. The processes herein indicated may be easily and conveniently carried out with a minimum of difficulty.

I claim:

1. An apparatus for welding along a continuous ring-like line which comprises:

a mounting means for supporting parts of said apparatus adapted to be located relative to parts to be welded, said mounting means including a support, a nonconductive housing mounted on said support, said housing having an internal cavity located therein, an opening extending therethrough and a notch extending into said cavity from the exterior thereof of said opening, said notch and said opening being of such dimension that parts to be welded are capable of being inserted into said opening through said notch, a holding means comprising an electrode assembly rotatably mounted within said housing, said assembly having a centrally located opening therein in alignment with said opening in said housing and a notch leading from its exterior to said opening, said notch and said opening being capable of fitting around parts to be welded located so as to extend into said opening, a plurality of electrodes mounted on said holding means so as to be capable of being rotated by the rotation of said holding means, said electrodes being insulated from one another, being spaced equally from one another around the axis of rotation of said holder and being located at equal distances from said axis, and being in the same plane transverse to the axis of said opening in said holding means, means for rotating said holding means relative to said mounting member, and slip ring means for supplying separate welding currents to each of said electrodes as said holding means and said electrodes are rotated, retainer means for securing parts to be welded within said housing rotatably mounted on said housing so as to be capable of being moved to secure such parts relative to said housing so that such parts are positioned within said openings, said slip ring means for supplying separate welding currents includes electrically conductive plates mounted within said housing, said electrode assembly includes electrode holders in engagement with said plates and rotatably mounted on said plates so that current can pass through said plates to said electrode holders and said electrodes, terminal plates for use in grounding said parts to be welded within said apparatus attached to said housing so as to extend therefrom in engagement with such parts held in said housing and extending into said openings.

2. An apparatus as claimed in claim 1 wherein:

said means for rotating includes gear means located within said housing and gear teeth located upon said electrode assembly, said gear means including two separate gears engaged with said gear teeth in said assembly at a distance which is greater than the distance across said opening in said assembly.

* * * * *